US007822955B2

(12) United States Patent
Flynn et al.

(10) Patent No.: US 7,822,955 B2
(45) Date of Patent: Oct. 26, 2010

(54) DATA PROCESSING APPARATUS AND METHOD FOR UTILIZING ENDIANESS INDEPENDENT DATA VALUES

(75) Inventors: David W Flynn, Cambridge (GB); David J Seal, Cambridge (GB); Wilco Dijkstra, Cambridge (GB); Michael R Nonweiler, Cambridge (GB)

(73) Assignee: ARM Limited, Cambridge (GB)

( * ) Notice: Subject to any disclaimer, the term of this patent is extended or adjusted under 35 U.S.C. 154(b) by 1768 days.

(21) Appl. No.: 10/347,481

(22) Filed: Jan. 21, 2003

(65) Prior Publication Data

US 2004/0143728 A1 Jul. 22, 2004

(51) Int. Cl.
G06F 7/00 (2006.01)
(52) U.S. Cl. ..................................... 712/300
(58) Field of Classification Search .................. 712/300
See application file for complete search history.

(56) References Cited

U.S. PATENT DOCUMENTS

| | | | | |
|---|---|---|---|---|
| 5,125,088 A * | 6/1992 | Culley | ......................... | 713/400 |
| 5,369,621 A * | 11/1994 | Mason | .................. | 365/230.06 |
| 5,550,987 A * | 8/1996 | Tanaka | ....................... | 710/106 |
| 5,692,517 A * | 12/1997 | Junker | ......................... | 600/545 |
| 5,796,973 A * | 8/1998 | Witt et al. | .................... | 712/208 |
| 5,946,468 A * | 8/1999 | Witt et al. | .................... | 712/218 |
| 6,772,244 B2 * | 8/2004 | Nguyen et al. | ................. | 710/58 |

OTHER PUBLICATIONS

Computer Organization and Design by David Patterson and John Hennessy.*
Computer Organization and Design by David Patterson and John Hennessy. © 1997. pp. 346-347 and inside back cover 2 pages.*

* cited by examiner

*Primary Examiner*—Aimee J Li
(74) *Attorney, Agent, or Firm*—Nixon & Vanderhye P.C.

(57) ABSTRACT

The present invention provides a technique for swapping data values within a data word. In particular, a single endian reverse instruction is provided to cause independent swap operations to be performed on particular sections of an input data word. The data processing apparatus of the present invention comprises a data processing unit for executing instructions which is responsive to the endian reverse instruction to apply an endian reverse operation to an input data word Rm comprising a plurality of data values. The endian reverse operation yields a result data word Rd given by: treating the input data word as consisting of a plurality of input sections, the result data word having a corresponding plurality of result sections, at least one input section comprising a plurality of data values; and for at least one of the input sections comprising a plurality of data values, performing an independent swap operation on the data values within that input section to form the result data word Rd in which the corresponding result section has its data values swapped with respect to that input section. This provides a particularly efficient technique for providing endian reversal functionality within a data processing apparatus supporting a variety of data structures, such as packed halfwords, zero extended halfwords, sign extended halfwords, etc.

35 Claims, 6 Drawing Sheets

32-BIT REVERSE

16-BIT PACKED REVERSE

DATA PROCESSING APPARATUS AND METHOD FOR UTILIZING ENDIANESS INDEPENDENT DATA VALUES

BACKGROUND OF THE INVENTION

1. Field of the Invention

The present invention relates to a data processing apparatus and method for swapping data values.

2. Description of the Prior Art

Two types of data formats are commonly supported within the computing industry, namely big-endian and little-endian. In little-endian format, an address for a data word always identifies the least significant byte of the addressed data word, and hence in little-endian notation byte [0] is used to denote the least significant byte of the data word. In big-endian format, the address for a data word always identifies the most significant byte of the addressed data word, and accordingly byte [0] is used in big-endian notation to identify the most significant byte of the data word.

Typically, the data processing unit of a data processing apparatus will be arranged to apply operations to data of one particular format, and hence one data processing unit may be arranged to operate on big-endian data words, whilst another data processing unit may be arranged to operate on little-endian data words. However, there is an increasing need for information to be shared between data processing units, and accordingly steps need to be taken to ensure that any particular processor can handle data that has originated as either big-endian data or little-endian data. As an example, within large data processing systems, different types of computers are now being purchased to perform different tasks, and accordingly the overall system may include both big-endian processors and little-endian processors, with the data needing to be shared between the various processors.

One way in which this problem has been dealt with in the prior art is for a chip containing a particular processor (for example a little-endian processor) to be arranged so that only data of the appropriate format (in this example little-endian data) can be received at the interface to the chip. This has the advantage that it avoids increased complexity within the chip to facilitate handling of both big-endian and little-endian data. However, the main disadvantage is that such an approach places significant constraints on the logic arranged to interface with the chip, since functionality needs to be put in place to enable the endianness of data to be swapped where necessary prior to input of that data to the chip.

A data word can be considered as consisting of a plurality of data values, where a data value is the basic unit of addressable data. Hence, typically, a data value will be a byte of data, and the data word will consist of a plurality of bytes, e.g. four bytes for a 32-bit data word, eight bytes for a 64 bit data word, etc. When swapping the endianness of a data word, the ordering of the constituent data values (e.g. bytes) is reversed. Hence, if a big-endian 32-bit data word consists of the bytes ABCD, then the swapping of the endianness of that data word will result in the equivalent little-endian data word DCBA.

With the above described prior art approach, where any required switching of endianness occurs prior to input of the data to the chip containing the data processing unit, the size of the data word subjected to the endianness swap is dictated by the bandwidth of the interface. Hence, if the interface has a bandwidth of 32-bits, the data word will be considered to be 32-bits in length, and any endianness swap will involve the above-described reversal of the four bytes making up the 32-bit data word. Similarly, if the interface has a bandwidth of 64-bits, then the data word will be considered to be 64-bits in length, and an endianness swap operation external to the chip will involve reversal of the order of the eight bytes making up that data word.

This approach hence does adversely affect the ability of the data processing unit on the chip to handle different types of data structures (for example data word, half data word, unaligned data word (i.e. a data word where the address is not a multiple of the data word size), etc), in situations where a swap in endianness of the data is required prior to inputting that data into the chip.

An alternative approach to that described above is to allow data of either endianness to be input via the interfaces of the chip, and then provide some internal functionality to swap the endianness of the data if required prior to it being processed by the data processing unit. However, due to the extra complexity resulting from the presence of data of either endianness on the same chip, it has up to now been considered possible to only provide an endianness swapping functionality for a predetermined size data word. Hence, although this approach alleviates the constraint that would otherwise be placed on logic designed to interface with the chip if the chip were only to be able to receive data of one endianness, the problem of efficiently handling other types of data structures, such as sub-words (for example halfwords), remains.

Accordingly, it is an object of the present invention to provide a data processing apparatus which can receive both little-endian and big-endian data but which can efficiently handle data structures other than one predetermined size data word.

SUMMARY OF THE INVENTION

Viewed from a first aspect, the present invention provides a data processing apparatus, comprising: a data processing unit for executing instructions; the data processing unit being responsive to an endian reverse instruction to apply an endian reverse operation to an input data word Rm comprising a plurality of data values, wherein said endian reverse operation yields a result data word Rd given by: treating the input data word as consisting of a plurality of input sections, the result data word having a corresponding plurality of result sections, at least one input section comprising a plurality of data values; and for at least one of the input sections comprising a plurality of data values, performing an independent swap operation on the data values within that input section to form the result data word Rd in which the corresponding result section has its data values swapped with respect to that input section.

In accordance with the present invention, a data processing unit within a data processing apparatus is arranged to be responsive to an endian reverse instruction to apply an endian reverse operation to an input data word Rm comprising a plurality of data values. The input data word is then considered as a plurality of input sections, with at least one input section comprising a plurality of data values, and the result data word is considered as a corresponding plurality of result sections. The data processing unit is arranged, for at least one of the input sections comprising a plurality of data values, to perform an independent swap operation on the data values within that input section. As a result of execution of this endian reverse instruction, the result data word Rd is obtained in which the corresponding result section has its data values swapped with respect to that input section.

Hence, in accordance with the present invention, a single instruction is defined which causes the data processing unit to perform an independent swap operation on one or more component sections of an input data word. This provides a very efficient technique for supporting the swapping of endianness of individual sections, for example sub-words, of a particular input data word, and hence significantly improves the efficiency with which the data processing apparatus can support such data structures in situations where endianness reversal may be required.

It will be appreciated that the endian reverse instruction may be arranged to specify which sections of the input data word should be subjected to the independent swap operation. In one preferred embodiment, the endian reverse instruction will cause the data processing unit to perform the independent swap operation on each of the input sections of the input data word, in this instance each input section having a plurality of data values.

It will also be appreciated by those skilled in the art that the number of sections that the input data word is treated as consisting of can be varied, dependent on the structure of the data to which the endian reverse instruction is applicable. However, in one preferred embodiment, the input data word is treated as consisting of two input sections, and hence, for example, the endian reverse instruction is suitable for causing the data processing unit to swap the endianness of halfwords.

In one preferred embodiment, the input data word Rm comprises a plurality of input sub-words, and at said treating step, each input section is arranged to contain one input sub-word, whereby the result data word Rd contains a plurality of result sub-words, each of which has its data values swapped with respect to the corresponding input sub-word. Hence, in such an embodiment, the input data word comprises a plurality of packed input sub-words, such as may be specified for certain Single Instruction Multiple Data (SIMD) operations.

It will be appreciated that in such embodiments, the number of sub-words that are packed into a single data word may be varied. However, in preferred embodiments, the input data word Rm comprises two input sub-words. In a particularly preferred embodiment, the input data word Rm is 32 bits in length, and each sub-word is 16 bits in length.

It will be appreciated that the endian reverse instruction is not only applicable to such packed data words. For instance, as an alternative, the input data word Rm may comprise one or more input sub-words, each input sub-word comprising a plurality of input sections, a first input section containing significant data and one or more other input sections containing zeros, whereby the result data word Rd contains one or more result sub-words, each of which has its significant data swapped with respect to the corresponding input sub-word. By placing the significant data of each sub-word within a single section, the swap operation can then be applied to that section in order to change the endianness of that significant data. As regards the zeros, it will be appreciated that they can be contained within one or more input sections, and those sections may or may not be subjected to the swap operation. It will be appreciated that the result of a swap operation on a section that contains just zeros is that the data remains unchanged, and hence the result data word Rd will contain one or more result sub-words, each of which still maintains the zeros, but each of which has its significant data swapped with respect to the corresponding input sub-word.

Hence, in preferred embodiments, the same single endian reverse instruction can be used to reverse the endianness of packed sub-words or zero extended sub-words, whether packed or not.

In one preferred embodiment, the input data word Rim is arranged to contain one zero extended input sub-word. Further, in preferred embodiments, the significant data forms half of each sub-word. Hence, in a particularly preferred embodiment where the input data word is 32 bits in length, this input data word will contain 16 bits of significant data which is zero extended to 32 bits.

As mentioned earlier, the endian reverse instruction can be arranged to specify which input sections are subjected to the independent swap operation, and in situations where not all of the sections are subjected to the swap operation, it is possible to subject other of the sections to different operations. More particularly, in one preferred embodiment, the data processing unit is additionally responsive to the endian reverse instruction to, for at least one other of the input sections, perform an alternative operation to the independent swap operation to form the result data word Rd in which the corresponding result section has its data values produced by the alternative operation.

Such an approach can be beneficial in a variety of situations, for example where it is desired to sign extend certain data, saturate certain data, etc. In one embodiment, the data values produced by the alternative operation are zero regardless of the input data word Rm. In an alternative embodiment, the alternative operation is a sign-extension operation.

More particularly, in one embodiment, the input data word Rm comprises one or more input sub-words, at least one input sub-word comprising a plurality of input sections, a first input section containing significant data and one or more other input sections containing other data, for each input sub-word comprising a plurality of input sections the independent swap operation being performed on the first input section to produce a corresponding first result section and the sign-extension operation producing for that first result section sign extension data to form one or more result sections corresponding to said other input sections, whereby the result data word Rd contains one or more result sub-words, at least one result sub-word of which has its significant data swapped and sign extended with respect to the corresponding input sub-word.

As will be appreciated by those skilled in the art, it will often be the case that the original sign extension is wrong once the swap operation has been performed on the input section containing the significant data, since the order of the individual data values within that section will have been reversed, and the sign extension bit is given by the most significant bit of the most significant data value following application of the swap operation.

It will be appreciated that the input data word Rm could contain one or more sub-words. However, in preferred embodiments, the input data word Rm comprises one sub-word (which may or may not be sign-extended). In one preferred embodiment, the significant data forms half of each input sub-word. Hence, in a particularly preferred embodiment, the input data word is a 32-bit word, with the significant data consisting of 16 bits.

It will be appreciated that the input sections can be defined as required. However, in one embodiment, all input sections are chosen to contain the same number of data values.

It will be appreciated that the input data word manipulated by the data processing unit as described above may be stored in any appropriate storage medium accessible by the data processing unit. However, in preferred embodiments, the data words manipulated by the data processing unit are first stored in registers of a register bank, and accordingly in preferred embodiments a source register is provided for storing the input data word Rm, and a destination register is provided for storing the result data word Rd. It will be appreciated that there is no requirement for a separate source register and destination register, and in certain embodiments the source register and destination register can be provided by the same physical register.

As mentioned previously, the data value is the basic unit of addressable data, and hence the size of the data value will depend on the implementation. However, in preferred embodiments, each input data value comprises 8 bits (i.e. 1 byte). Furthermore, in preferred embodiments the input data word Rm comprises 32 bits, as indeed does the result data word Rd. However, as mentioned previously, there is no requirement for the data words to be 32 bits long, and any other size of data word could be supported, for example 64 bits.

Viewed from a second aspect, the present invention provides a method of operating a data processing apparatus comprising a data processing unit for executing instructions, the method comprising the steps of: in response to an endian reverse instruction causing the data processing unit to apply an endian reverse operation to an input data word Rm comprising a plurality of data values, wherein said endian reverse operation yields a result data word Rd given by: treating the input data word as consisting of a plurality of input sections, the result data word having a corresponding plurality of result sections, at least one input section comprising a plurality of data values; and for at least one of the input sections comprising a plurality of data values, performing an independent swap operation on the data values within that input section to form the result data word Rd in which the corresponding result section has its data values swapped with respect to that input section.

Viewed from a third aspect, the present invention provides a computer program operable to configure a data processing apparatus to perform a method in accordance with the second aspect of the present invention. The invention also relates to a carrier medium comprising such a computer program. The carrier medium may be any suitable computer readable storage medium, for example a CDROM, a diskette, etc, or indeed may be a transmission medium such as an optical fibre, radio signal, etc.

BRIEF DESCRIPTION OF THE DRAWINGS

The present invention will be described further, by way of example only, with reference to a preferred embodiment thereof as illustrated in the accompanying drawings, in which.

DESCRIPTION OF PREFERRED EMBODIMENT

For the purposes of describing a preferred embodiment of the present invention, a data processing apparatus will be considered which incorporates a processor arranged to perform operations on 32-bit data words. More particularly, in preferred embodiments, the processor is an ARM processor core as designed by ARM Limited of Cambridge, United Kingdom, which is arranged to perform operations defined by 32-bit ARM instructions.

In accordance with preferred embodiments of the present invention, three endian reverse instructions are provided within the ARM instruction set which are arranged to cause the processor core to perform predetermined swap operations on the bytes making up a data word in order to reverse the endianness of that data word. A fourth endian reverse instruction is also considered in accordance with one embodiment of the present invention.

The first endian reverse instruction is a REV instruction which is arranged to cause the processor core to reverse the order of the bytes in a 32-bit register specified by the REV instruction. An abbreviated Backus-Naur description of the REV instruction is provided below:

REV {<cond>}Rd, Rm

Where

"cond" is the condition under which the instruction is executed.

"Rd" specifies the destination register of the instruction.

"Rm" specifies the source register that contains the data word whose bytes are to be reversed.

Assuming the condition under which the instruction is to be executed is met, or if no condition is specified, then the REV instruction is arranged to cause the following operation to be performed:

Rd[31:24]<=Rm[7:0]
Rd[23:16]<=Rm[15:8]
Rd[15:8]<=Rm[23:16]
Rd[7:0]<=Rm[31:24]

Figure 4A:
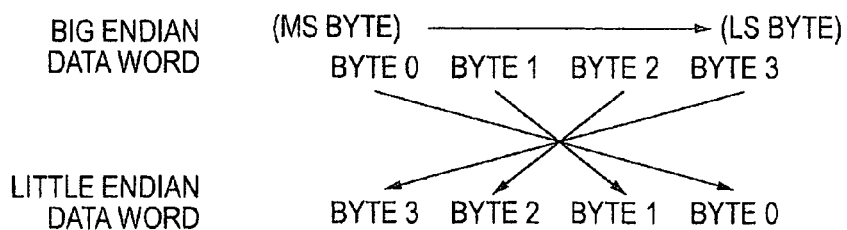
FIGS. 4A to 4E schematically illustrate different reverse operations which may be specified by an endian reverse instruction in accordance with preferred embodiments of the present invention.

This operation is illustrated schematically in FIG. 4A for the situation in which the source data word is a big endian data word which is to be swapped to little endian via the REV instruction. As can be seen from FIG. 4A, byte zero represents the most significant byte of the big endian data word, which following application of the REV instruction becomes the least significant byte of the equivalent little endian data word. It will be appreciated that the REV instruction, and indeed all of the endian reverse instructions to be discussed herein, may be applied to big endian data words to swap them into little endian data words, or to little endian data words to swap them into big endian data words.

For completeness, the following table illustrates how the various fields of the REV instruction may be specified using a 32-bit instruction word:

TABLE 1

| 31...28 | 27...23 | 22 | 21 20 | 19...16 | 15...12 | 11...8 | 7 | 6...4 | 3...0 |
|---|---|---|---|---|---|---|---|---|---|
| COND | 01101 | 0 | 11 | SBO | Rd | SBO | 0 | 011 | Rm |

Bits 27 to 20 and 7 to 4 in combination represent the opcode of the instruction, and hence uniquely identify the REV instruction. The notation "SBO" indicates "Should Be One".

In addition to the REV instruction, the data processing apparatus of preferred embodiments of the present invention also provides an additional endian reverse instruction called the REV16 instruction, which is used to reverse the bytes in the lower 16-bits of a 32-bit source register and also independently reverse the bytes in the upper 16-bits of the 32-bit source register. The format of the REV16 instruction is similar to that of the REV instruction, and can be indicated as follows:

REV16{<cond>} Rd, Rm

Assuming any condition that is specified is met, the REV16 instruction is arranged to cause the following operation to be performed:

Rd[31:24]<=Rm[23:16]
Rd[23:16]<=Rm[31:24]
Rd[15:8]<=Rm[7:0]
Rd[7:0]<=Rm[15:8]

Figure 4B:
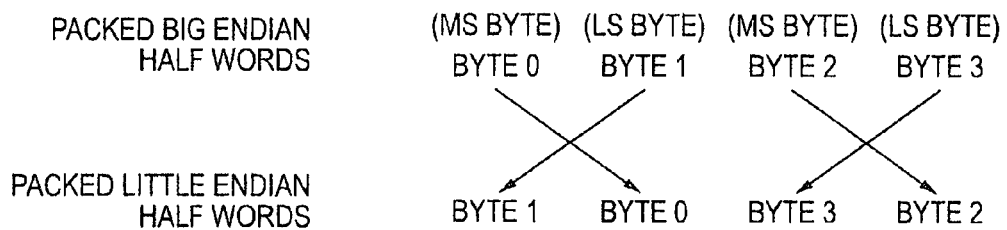

This operation is indicated schematically in FIG. 4B for the example where a 32-bit big-endian data word is actually formed of two packed 16-bit big-endian halfwords, which each need to independently have their endianness changed to little-endian.

Such packed data words occur in a variety of situations, for example in implementations where SIMD instructions are supported.

Figure 4C:
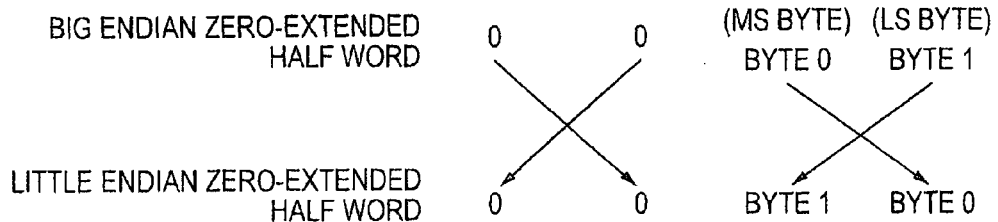

In addition to using the REV16 instruction in the manner illustrated in FIG. 4B (and of course for an analogous situation where little-endian halfwords are to be swapped to produce big endian halfwords), the same REV16 instruction can also be used to swap the endianness of a 16-bit unsigned (also referred to as a zero extended) data item within a 32-bit register, as illustrated in FIG. 4C. Again, by analogy, the same REV16 instruction can also be used to convert a little-endian zero-extended halfword into a big-endian zero-extended halfword. As is apparent from FIG. 4C, since the upper two bytes of the 32-bit register contain zero bits, the swap operation applied to those two bytes produces no change, and hence the resultant halfword is still correctly zero-extended to 32 bits.

For completeness, the following table illustrates how the REV16 instruction can be specified using a 32-bit instruction word in accordance with preferred embodiments of the present invention:

TABLE 2

| 31...28 | 27...23 | 22 | 21 20 | 19...16 | 15...12 | 11...8 | 7 | 6...4 | 3...0 |
|---|---|---|---|---|---|---|---|---|---|
| COND | 01101 | 0 | 11 | SBO | Rd | SBO | 1 | 011 | Rm |

As with the REV instruction, bits 27 to 20 and 7 to 4 in combination represent the opcode of the instruction and hence uniquely identify the REV16 instruction (note that bit 7 is now set to a logic one value, whereas for the REV instruction it is set to a logic zero value).

In accordance with preferred embodiments of the present invention a third endian reverse instruction is the REVSH instruction which is used to cause the processor core to reverse the bytes in the lower 16 bits of a 32 bit source register, and sign-extend the result to 32 bits using the resultant most significant bit (i.e. register bit [15]. Again, the format of the REVSH instruction is similar to the format of the previous two endian reverse instructions, and can be indicated as follows:

REVSH{<cond>} Rd, Rm

Assuming any condition that is specified is met, the REVSH instruction is arranged to cause the following operation to be performed:

Rd[31:24]<=Rm[7]
Rd[23:16]<=Rm[7]
Rd[15:8]<=Rm[7:0]
Rd[7:0]<=Rm[15:8]

Figure 4D:
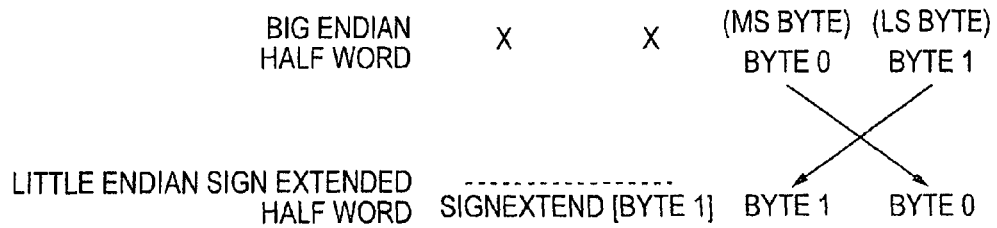

This operation is illustrated schematically in FIG. 4D, for the example where a big-endian halfword is to be transformed into a little-endian sign extended halfword. As with the previous endian reverse instructions, the instruction can equally well be applied to convert a little-endian halfword into a big-endian sign extended halfword.

For completeness, the following table illustrates how the REVSH instruction can be specified using a 32-bit instruction word in accordance with preferred embodiments of the present invention:

TABLE 3

| 31...28 | 27...23 | 22 | 21 20 | 19...16 | 15...12 | 11...8 | 7 | 6...4 | 3...0 |
|---|---|---|---|---|---|---|---|---|---|
| COND | 01101 | 1 | 11 | SBO | Rd | SBO | 1 | 011 | Rm |

Another endian reverse instruction that could also be provided in embodiments of the present invention is an equivalent of the REVSH instruction, but for zero extending the result rather than sign extending the result. Such an instruction will be referred to herein as the REVH instruction which is used to cause the processor core to reverse the bytes in the lower 16-bits of a 32-bit source register, and zero-extend the result to 32-bits. The format of the REVH instruction would be similar to the format of the REVSH endian reverse instruction, and can be indicated as follows:

REVH{<cond>} Rd, Rm

Assuming any condition that is specified is met, the REVH instruction is arranged to cause the following operation to be performed:

Rd[31:24]<=0
Rd[23:16]<=0
Rd[15:8]<=Rm[7:0]
Rd[7:0]<=Rm[15:8]

Figure 4E:
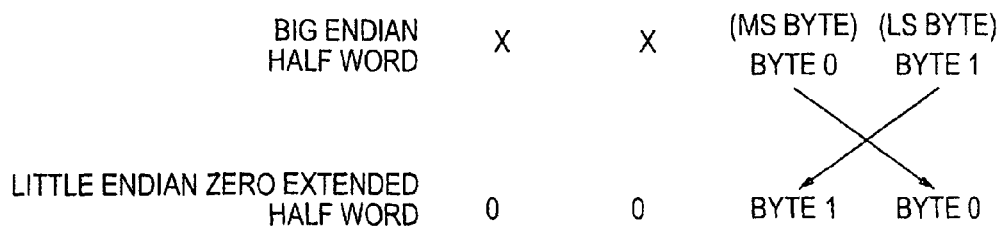

This operation is illustrated schematically in FIG. 4E, for the example where a big-endian halfword is to be transformed into a little-endian zero extended halfword. As with the previous endian reverse instructions, the instruction can equally well be applied to convert a little-endian halfword into a big-endian zero extended halfword.

It will be appreciated that there is no reason why the above types of endian reverse instruction need be restricted to 32-bit instruction sets, and indeed in preferred embodiments, analogous REV, REV16, REVSH and REVH instructions are also provided for a 16-bit instruction set supported by the ARM processor, referred to as the Thumb instruction set. Brief details of these instructions as provided for the Thumb instruction set are provided below:

Thumb REV Instruction
    Format of Instruction:

TABLE 4

| 15...12 | 11...8 | 7 | 6 | 5...3 | 2...0 |
|---------|--------|---|---|-------|-------|
| 1011    | 1010   | 0 | 0 | Rn    | Rd    |

Syntax:
REV Rd, Rn
Description:
reverse bytes in 32-bit register
Operation:
Rd[31:24]<=Rn[7:0]
Rd[23:16]<=Rn[15:8]
Rd[15:8]<=Rn[23:16]
Rd[7:0]<=Rn[31:24]

Thumb REV16 Instruction
    Format of Instruction:

TABLE 5

| 15...12 | 11...8 | 7 | 6 | 5...3 | 2...0 |
|---------|--------|---|---|-------|-------|
| 1011    | 1010   | 0 | 1 | Rn    | Rd    |

Syntax:
REV16 Rd, Rn
Description:
Byte reverse the top and bottom halfwords of a word (can also be used to reverse the bytes of a zero-extended halfword)
Operation:
Rd[31:24]<=Rn[23:16]
Rd[23:16]<=Rn[31:24]
Rd[15:8]<=Rn[7:0]
Rd[7:0]<=Rn[15:8]

Thumb REVSH Instruction
    Format of Instruction:

TABLE 6

| 15...12 | 11...8 | 7 | 6 | 5...3 | 2...0 |
|---------|--------|---|---|-------|-------|
| 1011    | 1010   | 1 | 1 | Rn    | Rd    |

Syntax:
REVSH Rd, Rn
Description:
Reverse bytes and sign-extend resultant halfword
Operation:
Rd[31:24]<=Rn[7]
Rd[23:16]<=Rn[7]
Rd[15:8]<=Rn[7:0]
Rd[7:0]<=Rn[15:8]

Thumb REVSH Instruction
    Syntax:
REVH Rd, Rn
Description:
Reverse bytes and zero-extend resultant halfword
Operation:
Rd[31:24]<=0
Rd[23:16]<=0
Rd[15:8]<=Rn[7:0]
Rd[7:0]<=Rn[15:8]

Having described the four variants of endian reverse instructions supported by preferred embodiments of the present invention, the manner in which those instructions are processed by the processor core in accordance with preferred embodiments will now be described in more detail with reference to FIGS. 1 and 2.

Figure 1:
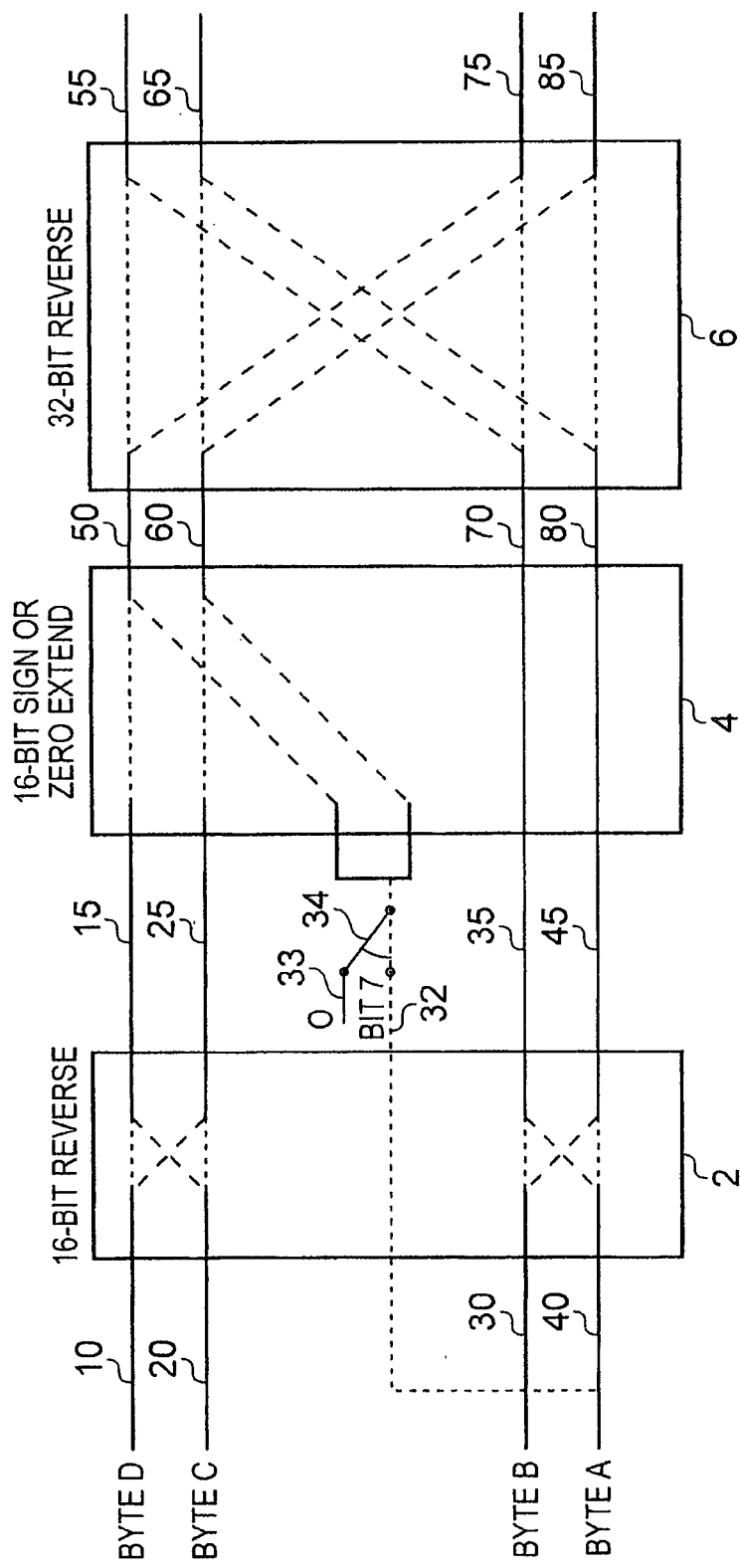
FIG. 1 is a diagram schematically illustrating how the bytes of a data word may be manipulated in preferred embodiments of the present invention dependent on the endian reverse instruction.

As shown in FIG. 1, bytes A to D of the data within the source register are received over corresponding paths 40, 30, 20, 10, respectively, of the swap function logic provided within the processor core to implement the various swap operations that may be specified by the above four described endian reverse instructions. Referring now to FIG. 2, the processor core first determines at step 200 the type of reverse instruction to be applied, and the process then proceeds to step 205, where the data word is read from the source register over paths 40, 30, 20, 10 as already discussed with reference to FIG. 1. The bytes then pass through a 16-bit reverse functional element 2 where, at step 210, data value D and data value C are swapped, and data value B and data value A are swapped. This is indicated by the dashed lines shown within the functional element 2 of FIG. 1.

It should be noted that if no endian reverse instruction is specified, then the bytes are not swapped, and proceed directly through the functional element 2 as indicated by the dotted lines in FIG. 1. However, in the event that the any of the endian reverse instructions is specified, then the swapping process discussed with reference to step 210 of FIG. 2 will always take place, and accordingly byte D will be output over path 25, byte C will be output over path 15, byte B will be output over path 45, and byte A will be output over path 35.

Returning to FIG. 2, the process then proceeds to step 215, where it is determined whether the instruction is a REV16 instruction. If it is, then the values on paths 15, 25, 35, and 45 pass through the remaining functional elements 4 and 6 unaltered, and hence appear on paths 55, 65, 75, 85 respectively, from where those bytes are then written as the result data word into the destination register at step 220. As shown in FIG. 2, the resultant data word hence is given by the bytes "CDAB", and accordingly it can be seen that the order of the upper two bytes has been reversed and the order of the lower two bytes has been reversed, thus achieving the result required by the REV16 instruction. As will be appreciated by those skilled in the art, in the event that the REV16 instruction is applied to a 16-bit zero extended value, bytes D and C in the source 32-bit register will be zeros, and accordingly their reordering in the destination register has no effect.

Figure 2:
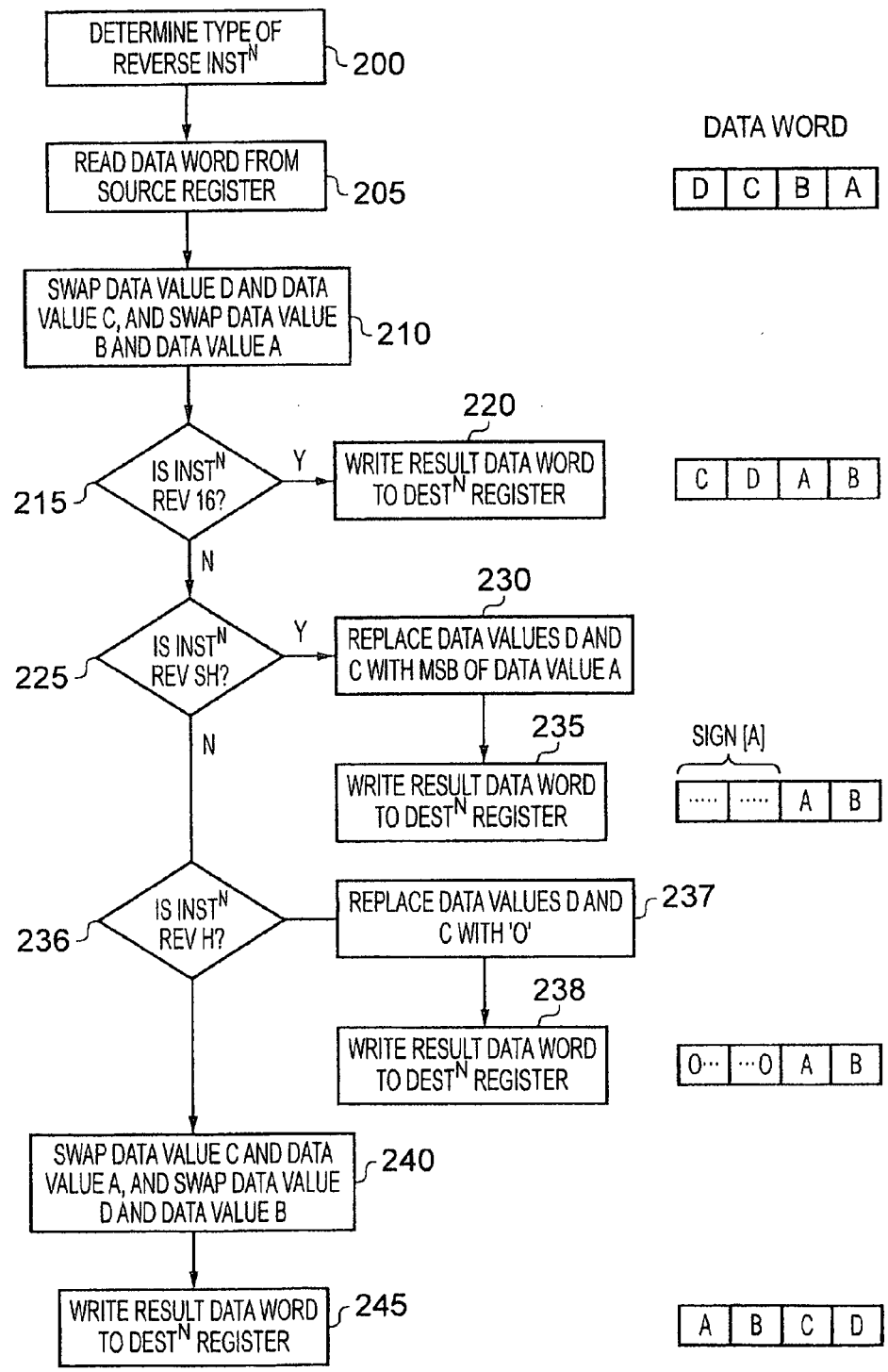
FIG. 2 is a flow diagram illustrating the process performed by the data processing unit of preferred embodiments when processing an endian reverse instruction of the preferred embodiments.

If at step 215 of FIG. 2, it is determined that the instruction is not a REV16 instruction, the process then proceeds to step 225, where it is determined whether the instruction is a REVSH instruction. If it is, then the process proceeds to step 230, where data values D and C are replaced with the most significant bit of data value A. This function is performed within the functional block 4 of FIG. 1, where, as indicated by the dashed lines, bit 7 of byte A is received over path 32, and then replicated 16 times at the output of switch 34 (which in this instance will be connected to path 32) to perform the necessary sign extension, 8 bits of the sign extension being output over path 50 and 8 bits being output over path 60.

The process then proceeds to step 235, where no further manipulation of the data occurs, and accordingly the data on paths 50, 60, 70, 80 passes through the functional block 6 unaltered and accordingly appears on paths 55, 65, 75, 85, respectively, from where it is written as the result data word into the destination register. As illustrated in FIG. 2, this results in the least significant byte of the result data word being given by byte B, the next significant byte being given by byte A, and the two most significant bytes being given by the sign extension of the most significant bit of byte A.

If at step 225 of FIG. 2 it is determined that the instruction is not a REVSH instruction, then the process proceeds directly to step 236 where it is determined whether the instruction is a REVH instruction. If it is, then the process proceeds to step 237, where data values D and C are replaced with zeros. This function is performed within the functional block 4 of FIG. 1, where, as indicated a zero value present on line 33 is replicated 16 times at the output of switch 34 (which in this instance will be connected to path 33) to perform the necessary zero extension, 8 bits of the zero extension being output over path 50 and 8 bits being output over path 60.

The process then proceeds to step 238, where no further manipulation of the data occurs, and accordingly the data on paths 50, 60, 70, 80 passes through the functional block 6 unaltered and accordingly appears on paths 55, 65, 75, 85, respectively, from where it is written as the result data word into the destination register. As illustrated in FIG. 2, this results in the least significant byte of the result data word being given by byte B, the next significant byte being given by byte A, and the two most significant bytes being given by zeros.

If at step 236 of FIG. 2, it is determined that the instruction is not a REVH instruction, then the process proceeds directly to step 240. At this point, it is apparent that the endian reverse instruction is the REV instruction, and accordingly at step 240, data value C and data value A are swapped, and data value D and data value B are swapped. This function is achieved within the functional block 6 as indicated by the dashed lines, and results in the bytes ABCD appearing on paths 55, 65, 75, 85, respectively, from where it is written as the result data word into the destination register. Hence, as can be seen from FIG. 2, in this instance, the entire data word has been subjected to a byte reversal, such that all four bytes are reversed with respect to their original position, as required by the REV instruction.

Figure 3:
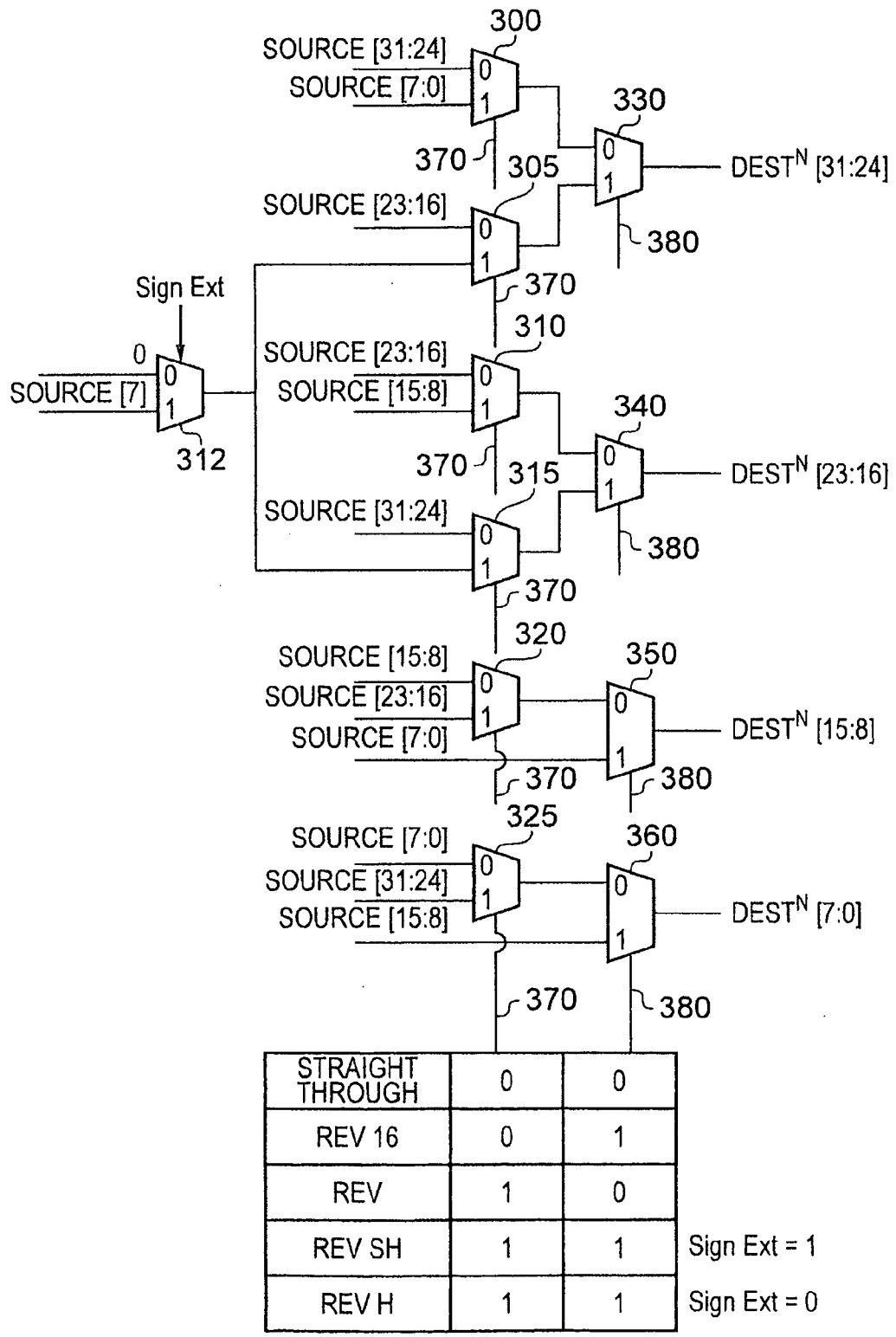
FIG. 3 is a block diagram illustrating the implementation of the swap function in accordance with one embodiment of the present invention.

FIG. 3 illustrates a preferred implementation of the function illustrated schematically with reference to FIGS. 1 and 2.

As can be seen from FIG. 3, six multiplexers 300, 305, 310, 315, 320 and 325 are each arranged to receive two 8-bit inputs, each of these six multiplexers being driven by the same drive signal over path 370, such that the first input is output from the multiplexer if the drive signal is at a logic zero level, and the second input is output from the multiplexer if the drive signal is at a logic one level.

As can be seen from FIG. 3, the outputs of multiplexers 300 and 305 are input into a further multiplexer 330, the outputs of multiplexers 310 and 315 are input into a further multiplexer 340, the output of multiplexer 320 is input to a multiplexer 350, which also receives as a second input bits 7 to 0 of the source register, and finally the output of multiplexer 325 is input to multiplexer 360, will also receives as a second input bits 15 to 8 of the source register. Each of the multiplexers 330, 340, 350 and 360 are driven by a single drive signal received over path 380, and are arranged to output the first input in the event that the drive signal is at a logic zero level, or the second input in the event that the drive signal is at a logic one level.

As can be seen from FIG. 3, the output of multiplexer 330 specifies bits 31 to 24 of the destination register, the output of multiplexer 340 specifies bits 23 to 16 of the destination register, the output of multiplexer 350 specifies bits 15 to 8 of the destination register, and the output of multiplexer 360 specifies bits 7 to 0 of the destination register.

As can be seen from FIG. 3, if no endian reverse instruction is specified, then the source register contents can pass unamended through to the destination register by setting the drive signals on paths 370 and 380 both to a logic zero level. If a REV16 instruction is specified, then the drive signal on path 370 is set to a logic zero level, whilst the drive signal on path 380 is set to a logic one level. If a REV instruction is specified, then the drive signal on path 370 is set to a logic one level, and the drive signal on path 380 is set to a logic zero level, whilst if a REVSH or a REVH instruction is specified, then both the drive signals on path 370 and 380 are set to a logic one value.

Considering the instance of a REVSH or REVH instruction being specified, it can be seen from FIG. 3 that the second input into both multiplexers 305 and 315 is provided by the output of an additional multiplexer 312. The multiplexer 312 receives as a first input a zero, and as a second input bit 7 of the source value (i.e. the input data word). The multiplexer 312 is driven by a "SignExt" signal which is set to 1 in the event of a REVSH instruction, and to zero otherwise. The output from the multiplexer 312 is either replicated eight times prior to its input to the multiplexers 305 and 315, or alternatively the inputs to the multiplexer 312 are replicated eight times. Hence, it can be seen that the necessary sign extension data gets passed through multiplexers 312, 305, 330 and 312, 315, 340 in the event of a REVSH instruction, whereas in the event of a REVH instruction the necessary sequence of zeros gets passed through the same multiplexers.

It should be noted that the multiplexer 312 can be replaced by any other suitable logic unit, for example by an AND gate arranged to receive at its input the SignExt signal and bit 7 of the source value.

Figure 5:
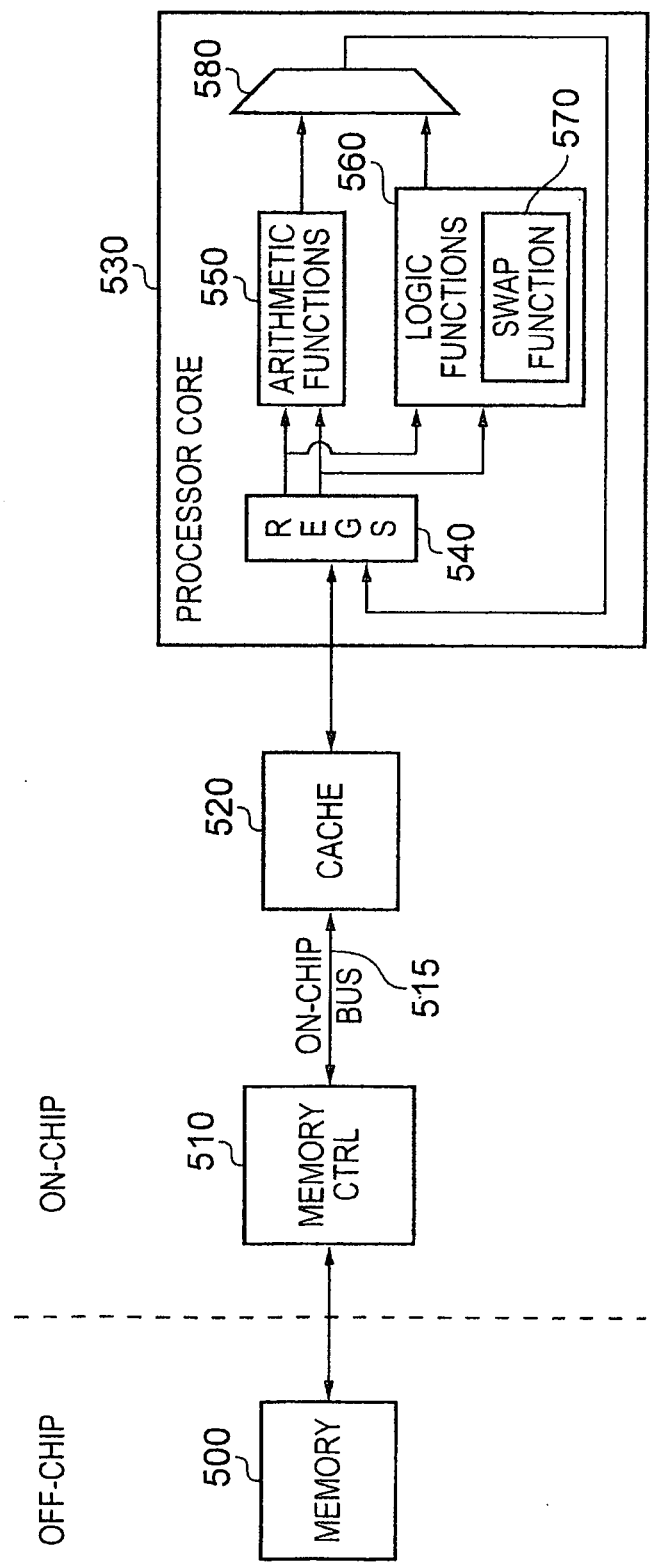
FIG. 5 is a schematic block diagram illustrating data paths within the data processing apparatus of preferred embodiments, and the location of the swap functionality of preferred embodiments.

FIG. 5 is a block diagram schematically illustrating the data path through a data processing apparatus in accordance with preferred embodiments of the present invention. The data processing apparatus will typically comprise a chip, and as illustrated in FIG. 5 may include the processor core 530, a cache 520, and a memory controller 510 via which the data processing apparatus can be coupled to an off-chip memory 500. When data is required by the processor core 530, it will be read into the register bank 540 from the cache 520 assuming that data is present within the cache 520. If not, then a communication between the cache and the memory controller 510 will occur via the on-chip bus 515, resulting in the required data being retrieved from the memory 500 and returned to the cache 520, from where it is loaded into the register bank 540. The contents of a number of the registers in the register bank 540 can then be loaded into either the arithmetic functional block 550 or the logic functional block 560, or in some embodiments may be loaded into both. In the example illustrated in FIG. 5, the contents of two registers can be loaded simultaneously into the arithmetic function block 550 and the logic function block 560. The arithmetic function block 550 is arranged to perform arithmetic operations such as add operations, whilst the logic function block is arranged to perform logical manipulations of the data values. Accordingly, in preferred embodiments, it is within the logic functional block 560 that the required swap functional logic 570, such as that discussed earlier with reference to FIG. 3, will be located.

The outputs from both blocks 550 and 560 are then output to a multiplexer 580, which will then output back to the register block 540 one of its inputs, dependent on whether the processor core 530 is currently performing an arithmetic operation within the block 550, or a logical operation within the block 560.

Hence, when the processor core 530 is executing one of the earlier described endian reverse instructions, the source register will be read from the register bank 540 into the logic function block 560, whereupon the required swap function logic 570 will be used to perform the necessary swap operation, after which multiplexer 580 will route the resultant data word back to the destination register of the register bank 540. The source and destination registers can be different registers within the register bank 540, or alternatively can be the same register such that the result of the operation is that the source register is overwritten with the endian swapped version of the data word.

From the above description, it will be apparent that the preferred embodiments of the present invention provide four endian reverse instructions, each of which can be used to efficiently implement an endian reversal operation for a particular type of data structure, for example a full data word, packed halfwords, zero extended halfwords, or halfwords to be sign-extended or zero extended. The provision of a single instruction to specify the required endian swapping operation significantly increases the efficiency of performing endian swap operations within the data processing apparatus.

Although a particular embodiment has been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

We claim:

1. A data processing apparatus, comprising:
   a data processing unit for executing a sequence of instructions for performing at least one arithmetic operation and at least one logical operation;
   a plurality of registers for storing data words for access by the data processing unit when executing said sequence of instructions;
   the data processing unit, responsive to an endian reverse instruction within said sequence specifying a source register and a destination register in said plurality of registers, for applying an endian reverse operation to an input data word Rm stored in said source register, the input data word comprising a plurality of data values, wherein said endian reverse operation yields a result data word Rd for storing in said destination register, the result data word given by:
   treating the input data word as consisting of a plurality of input sections, the result data word having a corresponding plurality of result sections, at least one input section comprising a plurality of data values; and
   for at least one of the input sections comprising a plurality of data values, performing an independent swap operation on the data values within that input section to form the result data word Rd in which the corresponding result section has its data values swapped with respect to that input section.

2. A data processing apparatus as claimed in claim 1, wherein each of the input sections comprises a plurality of data values, and the performing step comprises applying the independent swap operation to each of the input sections.

3. A data processing apparatus as claimed in claim 2, wherein said treating step comprises treating the input data word as consisting of two input sections.

4. A data processing apparatus as claimed in claim 2, wherein the input data word Rm comprises a plurality of input sub-words, and at said treating step, each input section is arranged to contain one input sub-word, whereby the result data word Rd contains a plurality of result sub-words, each of which has its data values swapped with respect to the corresponding input sub-word.

5. A data processing apparatus as claimed in claim 4, wherein the input data word Rm comprises two input sub-words.

6. A data processing apparatus as claimed in claim 2, wherein the input data word Rm comprises one or more input sub-words, each input sub-word comprising a plurality of input sections, a first input section containing significant data and one or more other input sections containing zeros, whereby the result data word Rd contains one or more result sub-words, each of which has its significant data swapped with respect to the corresponding input sub-word.

7. A data processing apparatus as claimed in claim 6, wherein the input data word Rm comprises one input sub-word.

8. A data processing apparatus as claimed in claim 6, wherein the significant data forms half of each input sub-word.

9. A data processing apparatus as claimed in claim 1, wherein the data processing unit is additionally responsive to the endian reverse instruction to, for at least one other of the input sections, perform an alternative operation to the independent swap operation to form the result data word Rd in which the corresponding result section has its data values produced by the alternative operation.

10. A data processing apparatus as claimed in claim 9, wherein the data values produced by the alternative operation are zero regardless of the input data word Rm.

11. A data processing apparatus as claimed in claim 9, wherein the alternative operation is a sign-extension operation.

12. A data processing apparatus as claimed in claim 11, wherein the input data word Rm comprises one or more input sub-words, at least one input sub-word comprising a plurality of input sections, a first input section containing significant data and one or more other input sections containing other data, for each input sub-word comprising a plurality of input sections the independent swap operation being performed on the first input section to produce a corresponding first result section and the sign-extension operation producing for that first result section sign extension data to form one or more result sections corresponding to said other input sections, whereby the result data word Rd contains one or more result sub-words, at least one result sub-word of which has its significant data swapped and sign extended with respect to the corresponding input sub-word.

13. A data processing apparatus as claimed in claim 12, wherein the input data word Rm comprises one input sub-word.

14. A data processing apparatus as claimed in claim 12, wherein the significant data forms half of each input sub-word.

15. A data processing apparatus as claimed in claim 1, wherein all input sections contain the same number of data values.

16. A data processing apparatus as claimed in claim 1, wherein each input data value comprises eight bits.

17. A data processing apparatus as claimed in claim 1, wherein the input data word Rm comprises thirty two bits.

18. A method of operating a data processing apparatus comprising a data processing unit for executing a sequence of instructions for performing at least one arithmetic operation and at least one logical operation, the data processing unit having access to a plurality of registers for storing data words for access by the data processing unit when executing the sequence of instructions, the method comprising the steps of:

said data processing unit applying, in response to an endian reverse instruction within said sequence specifying a source register and a destination register in said plurality of registers, an endian reverse operation to an input data word Rm stored in said source register, the input data word comprising a plurality of data values, wherein said endian reverse operation yields a result data word Rd for storing in said destination register, the result data word given by:

treating the input data word as consisting of a plurality of input sections, the result data word having a corresponding plurality of result sections, at least one input section comprising a plurality of data values; and for at least one of the input sections comprising a plurality of data values, performing an independent swap operation on the data values within that input section to form the result data word Rd in which the corresponding result section has its data values swapped with respect to that input section.

19. A method as claimed in claim 18, wherein each of the input sections comprises a plurality of data values, and the performing step comprises the step of applying the independent swap operation to each of the input sections.

20. A method as claimed in claim 19, wherein said treating step comprises the step of treating the input data word as consisting of two input sections.

21. A method as claimed in claim 19, wherein the input data word Rm comprises a plurality of input sub-words, and at said treating step, each input section is arranged to contain one input sub-word, whereby the result data word Rd contains a plurality of result sub-words, each of which has its data values swapped with respect to the corresponding input sub-word.

22. A method as claimed in claim 21, wherein the input data word Rm comprises two input sub-words.

23. A method as claimed in claim 19, wherein the input data word Rm comprises one or more input sub-words, each input sub-word comprising a plurality of input sections, a first input section containing significant data and one or more other input sections containing zeros, whereby the result data word Rd contains one or more result sub-words, each of which has its significant data swapped with respect to the corresponding input sub-word.

24. A method as claimed in claim 23, wherein the input data word Rm comprises one input sub-word.

25. A method as claimed in claim 23, wherein the significant data forms half of each input sub-word.

26. A method as claimed in claim 18, further comprising the step of:

for at least one other of the input sections, performing an alternative operation to the independent swap operation to form the result data word Rd in which the corresponding result section has its data values produced by the alternative operation.

27. A method as claimed in claim 26, wherein the data values produced by the alternative operation are zero regardless of the input data word Rm.

28. A method as claimed in claim 26, wherein the alternative operation is a sign-extension operation.

29. A method as claimed in claim 28, wherein the input data word Rm comprises one or more input sub-words, at least one input sub-word comprising a plurality of input sections, a first input section containing significant data and one or more other input sections containing other data, for each input sub-word comprising a plurality of input sections the independent swap operation being performed on the first input section to produce a corresponding first result section and the sign-extension operation producing for that first result section sign extension data to form one or more result sections corresponding to said other input sections, whereby the result data word Rd contains one or more result sub-words, at least one result sub-word of which has its significant data swapped and sign extended with respect to the corresponding input sub-word.

30. A method as claimed in claim 29, wherein the input data word Rm comprises one input sub-word.

31. A method as claimed in claim 29, wherein the significant data forms half of each input sub-word.

32. A method as claimed in claim 18, wherein all input sections contain the same number of data values.

33. A method as claimed in claim 18, wherein each input data value comprises eight bits.

34. A method as claimed in claim 18, wherein the input data word Rm comprises thirty two bits.

35. A computer program product comprising a computer-readable storage medium containing computer-readable instructions operable to configure a data processing apparatus to perform a method as claimed in claim 18.

* * * * *